US009384019B2

(12) United States Patent
Dawson et al.

(10) Patent No.: US 9,384,019 B2
(45) Date of Patent: *Jul. 5, 2016

(54) DYNAMIC CODE INJECTION

(71) Applicant: International Business Machines Corporation, Armonk, NY (US)

(72) Inventors: Michael H. Dawson, Ottawa (CA); Graeme Johnson, Ottawa (CA); San Hong Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/224,178

(22) Filed: Mar. 25, 2014

(65) Prior Publication Data

US 2015/0278077 A1  Oct. 1, 2015

(51) Int. Cl.
  *G06F 9/44*  (2006.01)
  *G06F 9/455*  (2006.01)
  *G06F 11/36*  (2006.01)
  *G06F 9/48*  (2006.01)
  *G06F 9/50*  (2006.01)

(52) U.S. Cl.
  CPC .............. *G06F 9/45504* (2013.01); *G06F 9/48* (2013.01); *G06F 9/50* (2013.01); *G06F 11/3688* (2013.01)

(58) Field of Classification Search
  None
  See application file for complete search history.

(56) References Cited

U.S. PATENT DOCUMENTS

| 7,418,630 | B1 * | 8/2008 | Vick | G06F 9/485 714/34 |
| 7,865,703 | B2 * | 1/2011 | Chen | G06F 11/3466 712/227 |
| 8,832,665 | B2 * | 9/2014 | Greifeneder | 717/127 |
| 2004/0268317 | A1 * | 12/2004 | Gouriou | G06F 9/4843 717/130 |
| 2005/0086648 | A1 * | 4/2005 | Andrews | G06F 11/3608 717/135 |
| 2006/0294435 | A1 * | 12/2006 | Vick | G06F 11/1438 714/38.13 |
| 2007/0261033 | A1 * | 11/2007 | Chen | G06F 11/3466 717/130 |
| 2008/0086296 | A1 * | 4/2008 | Kahlon | G06F 11/3608 703/23 |
| 2009/0235237 | A1 * | 9/2009 | Song | G06F 8/456 717/132 |
| 2009/0320001 | A1 * | 12/2009 | Bates | G06F 11/3636 717/129 |
| 2010/0192139 | A1 * | 7/2010 | Titzer | G06F 9/485 717/151 |
| 2010/0262812 | A1 * | 10/2010 | Lopez | G06F 9/30043 712/228 |
| 2010/0274972 | A1 * | 10/2010 | Babayan | G06F 9/3842 711/125 |
| 2011/0004869 | A1 * | 1/2011 | Kawahito | G06F 8/443 717/151 |
| 2011/0029490 | A1 * | 2/2011 | Agarwal | G06F 11/1474 707/684 |
| 2011/0138473 | A1 * | 6/2011 | Yee | G06F 9/445 726/26 |
| 2011/0283256 | A1 * | 11/2011 | Raundahl Gregersen | G06F 8/67 717/108 |

(Continued)

OTHER PUBLICATIONS

Litty et al., "Computer Meteorology: Monitoring Compute Clouds", 12th Workshop on Hot Topics in Operating Systems (HotOS 2009), May 2009, provided in search report provided by IPpro Services (India) Pvt. Ltd., dated Nov. 28, 2013.

Simão et al., "A2-VM: A Cooperative Java VM with Support for Resource-Awareness and Cluster-Wide Thread Scheduling", OTM Conferences, vol. 7044 of lecture notes in Computer Science, pp. 302-320, Springer-Verlag Berlin, Heidelberg, © 2011, provided in search report provided by IPpro Services (India) Pvt. Ltd., dated Nov. 28, 2013.

(Continued)

*Primary Examiner* — Insun Kang
(74) *Attorney, Agent, or Firm* — Noah A. Sharkan

(57) ABSTRACT

Embodiments of the present invention disclose an approach for inserting code into a running thread of execution. A computer sets a first set of bits to a first value, wherein the first value indicates that a first set of instructions should be inserted onto a stack. The computer executes a second set of instructions associated with a first safepoint, wherein the second set of instructions comprises one or more instructions to determine if the first set of bits is set to the first value. The computer determines that the first set of bits is set to the first value, and the computer inserts the first set of instructions onto the stack.

15 Claims, 5 Drawing Sheets

(56) References Cited

U.S. PATENT DOCUMENTS

| | | | | |
|---|---|---|---|---|
| 2011/0283263 | A1* | 11/2011 | Gagliardi | G06F 11/3644 717/130 |
| 2012/0159462 | A1* | 6/2012 | Leibman | G06F 11/1438 717/140 |
| 2012/0167057 | A1* | 6/2012 | Schmich | G06F 11/3644 717/130 |
| 2013/0312103 | A1 | 11/2013 | Brumley et al. | |
| 2014/0165049 | A1* | 6/2014 | Diamos | G06F 8/443 717/156 |
| 2015/0234683 | A1* | 8/2015 | Ogasawara | G06F 9/5016 711/163 |
| 2015/0256484 | A1* | 9/2015 | Cameron | G06F 9/3004 709/226 |

OTHER PUBLICATIONS

IBM, "IBM SDK, Java Technology Edition, V8: Beta Program, latest news and information", Apr. 2013, <http://www-01.ibm.com/support/docview.wss?uid=swg21615834>, "Grace Period Disclosure".

Dawson et al., "Dynamic Code Injection", U.S. Appl. No. 14/840,126, filed Aug. 31, 2015, pp. 1-33.

IBM Patents or Patent Applications Treated as Related, Appendix P, dated Aug. 31, 2015, pp. 1-2.

* cited by examiner

DYNAMIC CODE INJECTION

STATEMENT REGARDING PRIOR DISCLOSURES BY THE INVENTOR OR A JOINT INVENTOR

Various aspects of the present invention have been disclosed by an inventor or a joint inventor in the product IBM Software Development Kit, Java Technology Edition, Version 8: Beta Program, made publically available on Apr. 25, 2013. This disclosure is submitted under 35 U.S.C. 102(b)(1)(A). The following document is provided in support:

IBM SDK, Java Technology Edition, V8: Beta Program, latest news and information.

FIELD OF THE INVENTION

The present invention relates generally to the field of multitenant computing, and more particularly to injecting code into running threads of execution.

BACKGROUND OF THE INVENTION

In multitenant computing environments, multiple client computers run tenant applications in a single instance of a virtual machine, such as the Java Virtual Machine (JVM). For clients executing applications based in the Java® programming language, the single virtual machine instance is the JVM, which executes on a server computer and provides a virtual computing environment that accesses the physical resources of the server computer while maintaining isolation among the tenant applications and information that they access. The JVM executes Java bytecode using threads. Threads contain a program counter and a stack. The program counter keeps track of where the JVM is executing instructions (e.g., the memory location currently being used) and the number of instructions that have been executed on the thread. The stack is a last in first out (LIFO) data structure that contains frames, which include the bytecode detailing instructions to be performed by the server computer physical resources.

During execution of the thread, the thread can be at a "safepoint" or not at a safepoint. When at a safepoint, the thread's representation of the JVM is well described, and can be safely manipulated and seen by other threads in the JVM. When the thread reaches a safepoint, the thread may be safely blocked for a period of time in order to perform actions that affect all threads, such as garbage collection. During compilation of Java bytecode into compiled code, the compiler can determine that a safepoint exists at a certain place in the code and insert additional instructions that instruct the thread executing the compiled code to perform certain functions outside of the compiled application code.

SUMMARY

Embodiments of the present invention disclose a method, computer program product, and system for inserting code into a running thread of execution. A computer sets a first set of bits to a first value, wherein the first value indicates that a first set of instructions should be inserted onto a stack. The computer executes a second set of instructions associated with a first safepoint, wherein the second set of instructions comprises one or more instructions to determine if the first set of bits is set to the first value. The computer determines that the first set of bits is set to the first value, and the computer inserts the first set of instructions onto the stack.

DETAILED DESCRIPTION

Embodiments of the present invention recognize that, in virtualized, multitenant environments, certain operations may need to be performed that affect all threads and not just the thread(s) of a single tenant application. For example, in the Java Virtual Machine (JVM), resource management may include allocating access to memory or CPU resources across tenant applications in order to ensure that one tenant does not dominate CPU capacity while other tenant applications lack necessary CPU capabilities. Embodiments of the present invention disclose injecting code into a running thread to achieve a desired behavior. Various embodiments may be useful for, among other applications, computing resource allocation, statistics gathering, determining stack depth, and/or controlling the lifetime of particular threads.

Figure 1:
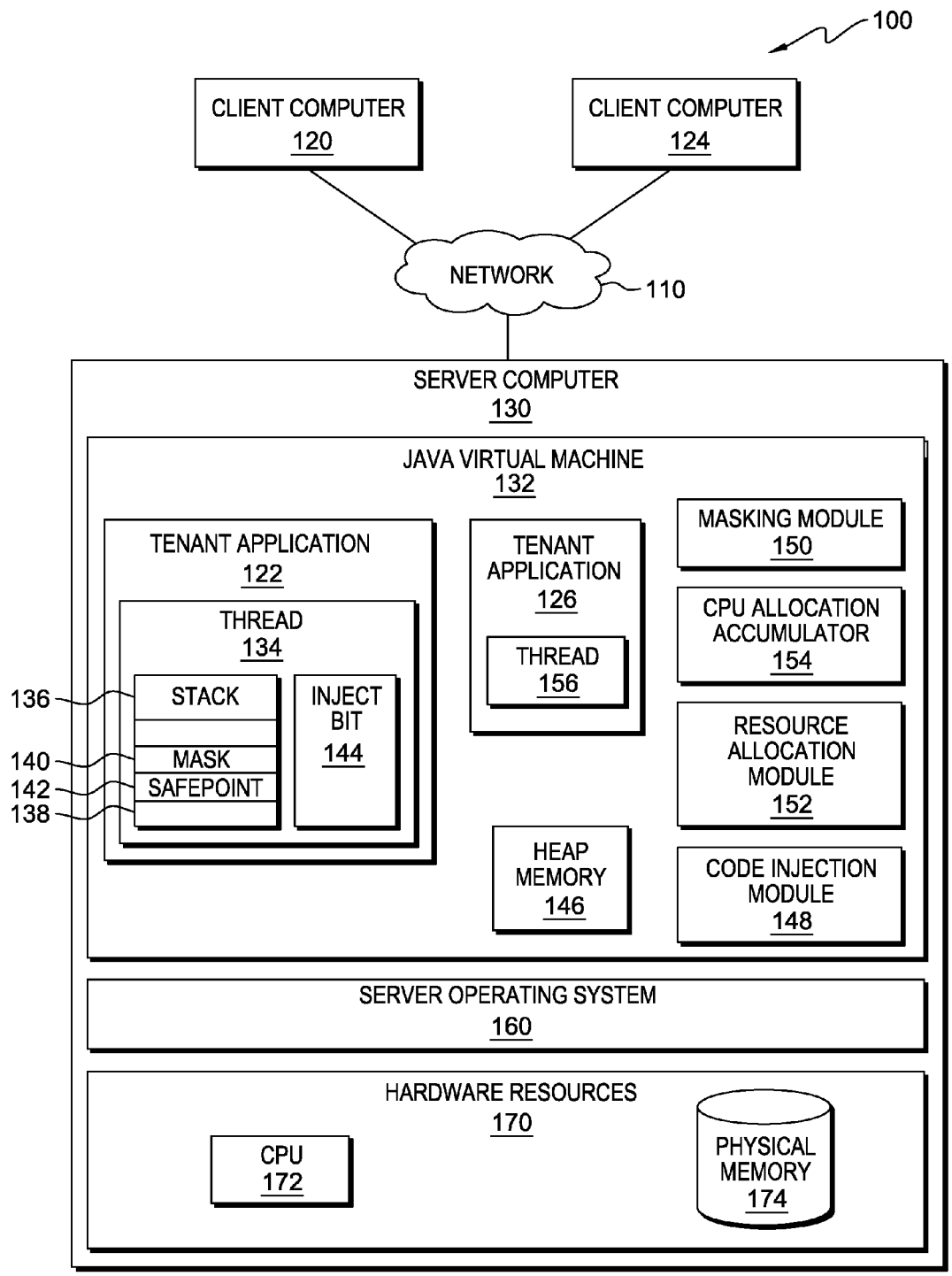
FIG. 1 is a functional block diagram illustrating a multi-tenant computing environment, in accordance with an embodiment of the present invention.

The present invention will now be described in detail with reference to the Figures. FIG. 1 is a functional block diagram illustrating a multitenant computing environment ("environment"), generally designated 100, in accordance with an embodiment of the present invention.

Environment 100 includes server computer 130 and client computers 120 and 124, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server computer 130 and client computers 120 and 124.

In various embodiments of the present invention, client computers 120 and 124, as well as server computer 130, can be servers, laptop computers, tablet computers, netbook computers, personal computers (PCs), desktop computers, personal digital assistants (PDAs) smart phones, or any programmable electronic devices capable of communicating over network 110. In another embodiment, server computer 130 and client computers 120 and 124 represent a computing system utilizing clustered computers and components to act as a single pool of seamless resources when accessed by elements of environment 100. In general, server computer 130 can be any computing device or combination of devices with access to thread 134, code injection module 148, masking module 150, resource allocation module 152, and CPU allocation accumulator 154, and capable of running code injection module 148, masking module 150, and resource allocation module 152. Server computer 130 may include internal and external hardware components, as depicted and described in further detail with respect to FIG. 5.

Server computer 130 includes server operating system 160, hardware resources 170, and JVM 132. In some embodiments, server operating system 160 is the native operating system of server computer 160. In various embodiments, server operating system 160 includes an application programming interface (API) which allows JVM 132 to access and allocate hardware resources 170, such as CPU 172 and physical memory 174, for use by tenant applications 122 and 126. In various embodiments, CPU 172 and physical memory 174 are shared physical resources that tenant applications 122 and 126 can access by interacting with JVM 132. In some embodiments, server operating system 160 can run programs, such as application services or daemons, which apply to all tenant applications running in JVM 132.

JVM 132 is a managed runtime environment that executes computer instructions written in Java bytecode by interpreting and/or compiling the instructions into machine code that hardware resources 170 can interpret. JVM 132 performs just-in-time (JIT) compilation on a Java-based programming language. This process converts the Java-based source code into object code that CPU 172 can interpret to perform various computer functions, such as arithmetic, read, and write functions. Additionally, JVM 132 manages one or more threads of execution associated with tenant applications 122 and 126, such as threads 134 and 156.

JVM 132 includes tenant applications 122 and 126. Tenant application 122 is associated with a single client computer, such as client computer 120, and tenant application 126 is associated with a different client computer, such as client computer 124. In various embodiments, tenant applications 122 and 126 represent computer readable software applications that access a shared pool of hardware resources in server computer 130 through a single, shared instance of JVM 132 operating on server computer 130. In various embodiments, tenant applications 122 and 126 are computer software code written in a programming language for compilation by JVM 132, such as, Java®, Jython®, Kotlin®, JRuby®, or other languages.

Tenant application 122 includes thread 134. Thread 134 is a mechanism within JVM 132 for executing a discrete sequence of programmed instructions. In various embodiments, thread 134 can include a program counter and/or a stack data structure, such as stack 136. In some embodiments, each tenant application, such as tenant applications 122 and 126, includes one or more associated threads. Additionally, in some embodiments, additional threads may be maintained by JVM 132 and/or server operating system 160 for operations such as garbage collection or hardware resource management. In various embodiments, other tenant applications, such as tenant application 126, include one or more associated threads, such as thread 156. Thread 156 further includes analogous contents, such as one or more stack data structures and an inject bit (not shown).

Thread 134 includes stack 136 and inject bit 144. Stack 136 comprises one or more frames, such as frame 138. Stack 136 is a "last in first out" (LIFO) data structure. In various embodiments, a frame can be added to the stack (pushed) for execution. Similarly, when a frame completes execution, the frame is removed (popped) from the top of the stack and the thread proceeds to process the frame below the popped frame. In various embodiments, frames include the necessary class information and reference information to modify and alter local variables. In various embodiments, stack 136 can include an associated bit that, when activated, masks the thread execution. Mask frame 140 includes program instructions to activate the mask bit to indicate that interruption of the thread execution may result in an exception. Safepoint 142 is a common component in the JVM 132 that indicates a particular point in thread execution at which the execution may be suspended for a period of time without disrupting the execution of the thread. For example, safepoints are commonly used to halt thread execution for the purposes of garbage collection. Safepoints occur at various intervals in the code, such as, after a return from method call or at a back jump of a loop. In various embodiments, safepoints can be identified at compile time by a compiler (e.g., a just-in-time compiler), and the compiler can insert program instructions for the thread executing the instructions to perform functions outside of the original application code. In some embodiments of the present invention, the instructions added at the safepoint include instructions to check one or more bits of information (e.g., inject bit 144) that, when set to a particular value, indicate that a set of program instructions should be injected onto the stack of the executing thread. In various embodiments of the present invention, JVM 132 injects a runnable interface at a thread safepoint in order to instruct the thread to execute the runnable method.

Inject bit 144 is one or more bits of information stored in association with thread 134 and, when set to a particular value, instructs thread 134 to push a runnable piece of code, such as a method onto the top of stack 136 when a safepoint is reached. In an embodiment, thread 134 executes the program instructions in stack 136 until a safepoint is reached. In this embodiment, the safepoint includes instructions to check a series of bits stored in association with thread 134. In this embodiment, one such bit (e.g., inject bit 144) instructs thread 134 to push a runnable method onto the stack for execution by the thread before returning to the code that was running when the thread reached the safepoint. In various embodiments, inject bit 144 can be set for safepoints occurring at regular time intervals. For example, inject bit 144 may be set to trigger injection once per second, but any safepoints that occur more frequently than once per second would have inject bit 144 set to a value that does not trigger injection. In this example, the thread will execute the injected runnable method at a regular interval. The injected runnable may include instructions to collect statistics, manage resource allocation, or terminate a thread.

JVM 132 includes heap memory 146, code injection module 148, masking module 150, resource allocation module 152, and CPU allocation accumulator 154.

Heap memory 146 is a memory data structure that is used to allocate class instances and arrays at runtime. In various embodiments, heap memory 146 provides for dynamic memory allocation that is divided into generations. In some embodiments, heap memory 146 has a young generation for short-lived objects that are created and then immediately garbage collected, and an old generation for objects that are used repeatedly by one or more threads.

Code injection module 148 is software capable of pushing a frame of runnable code onto stack 136 of thread 134. Additionally, code injection module 148 is capable of communicating with threads associated with other tenants operating on JVM 132. In various embodiments, code injection module 148 determines that thread 136 has reached a safepoint, checks inject bit 144 to determine if an injection of code into stack 136 should occur, and if so, injects a sequence of runnable code into the stack of the thread, which then executes the injected code before popping the runnable code and returning to code that was executing prior to the safepoint.

Masking module 150 is software capable of marking a particular thread as unsafe to halt for a code injection. In various embodiments, masking module 150 determines that a mask was called, that stack 136 reaches a safepoint, and that inject bit 144 is set, then masking module 150 clears the inject bit and sets a pending inject bit, which thread 134 will check when an unmask method is called.

Resource allocation module 152 is an example implementation of code injection module 148 directed to a specific embodiment in the context of resource allocation of CPU 172 time amongst tenant applications 122 and 126.

CPU allocation accumulator 154 is a data structure that maintains the allotment granted to each tenant computer by JVM 132. In various embodiments, CPU allocation accumulator 154 includes the number of cycles of CPU 172 that tenant application 122 is, on average, permitted to use in a defined period of time. In certain embodiments, CPU allocation accumulator 154 maintains a running total of the number of cycles used in the specified time. Resource allocation module 152 checks the status of running totals at safepoints, such as safepoint 142, and if tenant application 122 exceeds its allotment, then resource allocation module 152 ceases execution of thread 134 until tenant application 122 receives an additional allotment of CPU cycles at the end of the defined period of time.

Figure 2:
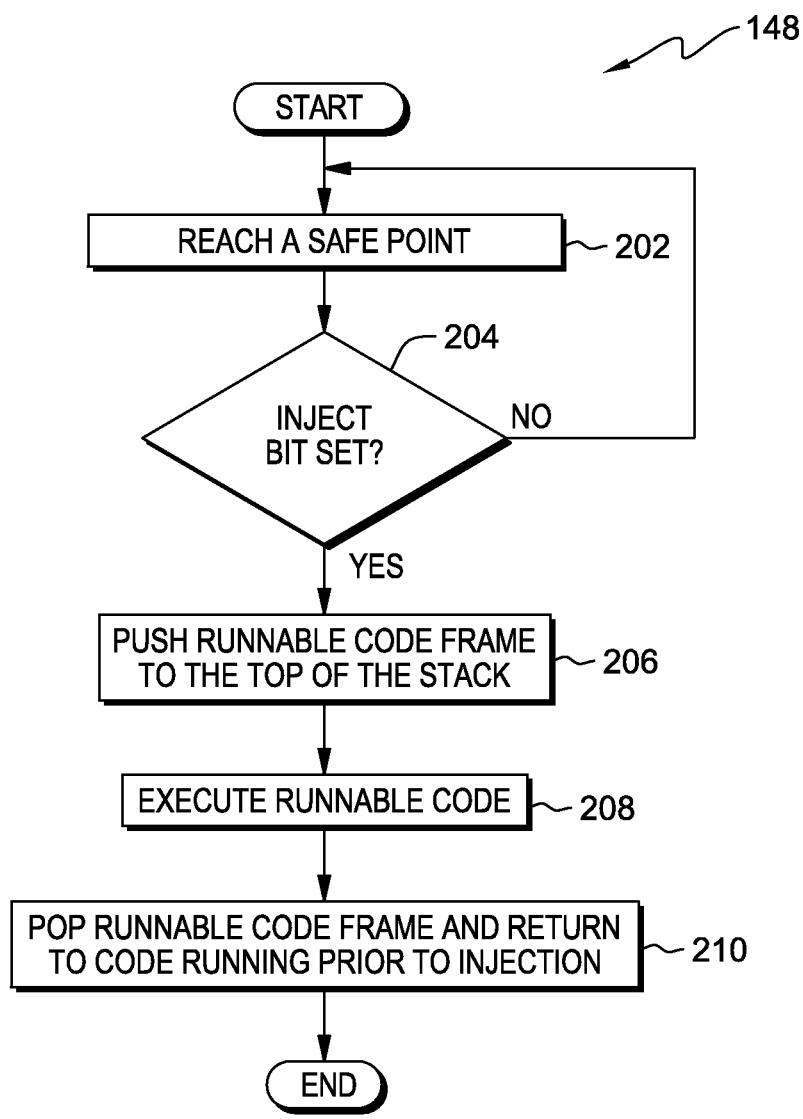
FIG. 2 is a flowchart depicting operational steps of a code injection module, on a server computer within the environment of FIG. 1, in accordance with an embodiment of the present invention.

FIG. 2 is a flowchart depicting operational steps of code injection module 148 operating within JVM 132, in accordance with an embodiment of the present invention. Code injection module 148 provides a computer implemented mechanism for safely halting executing threads in a multi-tenant JVM in order to inject runnable code onto the stack of one or more running threads. In various embodiments, code injection module 148 instructs JVM 132 to perform actions and manipulate data which may be carried out, for example, by thread 134, or an independent thread operating within JVM 132.

JVM 132 determines that thread 134 reaches a safepoint in its execution, such as safepoint 142 (step 202). Safepoints in threads executing within the JVM occur at predetermined times, for example, at the invocation of a particular method. Safepoints indicate particular points in the execution of the thread at which operations other than the code of the executing tenant application, such as tenant applications 122 and 126, may be safely executed by the thread. In one embodiment of the present invention, safepoints include instructions to perform maintenance functions or other statistics gathering functions. In an embodiment, a given safepoint includes instructions to check one or more bits of information stored within the thread to determine if any of the maintenance functions or statistics gathering functions should be performed while the thread is at a safepoint.

JVM 132 determines whether the inject bit is set (decision block 204). In one embodiment, one or more of the bits, such as inject bit 144, checked during the safepoint includes instructions to inject, or push, a particular piece of runnable code to the top of stack 136. In various embodiments, the injected code can include statistics gathering code or resource allocation code, such as resource allocation module 152. In various embodiments, inject bit 144 can be set to instruct JVM 132 to inject the runnable code at a safepoint or set to instruct JVM 132 not to inject any runnable code at this safepoint. In some embodiments, inject bit 144 can be set to inject runnable code at predetermined time intervals, such as once per second. If JVM 132 determines that the injection bit is not set to inject runnable code into stack 136 (decision block 204, NO branch), then JVM 132 waits until the next safepoint is reached in step 202. If JVM 132 determines that inject bit 144 bit is set and a runnable code should be injected into the stack at the safepoint, then JVM 132 proceeds to push a segment of runnable code to the top of the stack in step 206.

JVM 132 pushes a segment of runnable code to the top of stack 136 (step 206). In various embodiments of the present invention, the segment of runnable code can be an extension of the interface java.lang.Runnable( ). In other embodiments, the runnable code can be injected using any type of code, method, or function that will initiate a runnable sequence of code. The runnable interface provides a mechanism for inserting a runnable method onto stack 136 as well as other stacks that may be associated with other tenant applications. In various embodiments, extensions of the runnable interface include runnable methods that instruct the thread to perform various functions such as collect statistics, perform resource allocation functions, terminate a thread, or other functions.

JVM 132 executes the injected, runnable code (step 208). Thread 134, operating within tenant application 122 in JVM 132, now having a runnable method frame as at the top of stack 134, executes the instructions pushed to the top of stack 134. In various embodiments, the runnable code includes Java bytecode instructions that may relate to such functions as statistic collection, resource management, and/or thread termination. In various embodiments, the injected code is limited to code that will not break the tenant application code that was running prior to the injection. For example, allowing input/output resources in the injected code can cause exceptions if the code executing prior to the code injection was already using the input/output resources. In other embodiments, ensuring that the code being injected is pre-resolved, and that all class and/or field references have been initialized, avoids running a ClassLoader infrastructure, which may lead to various exceptions or errors.

JVM 132 pops the runnable method frame from stack 136 and returns to execution of the code in stack 136 on thread 134 that was running prior to the code injection (step 210). At the end of the runnable method executed in step 208, the code instructions include instructions to pop (i.e., remove) the frame containing the injected code from stack 136. In some embodiments, following the removal of the injected code, thread 134 returns to executing the frames that populated stack 136 prior to the injection of the runnable code. In other embodiments, the runnable code includes instructions to terminate thread 134, in which case, following the execution of the runnable code, stack 136 pops the frame containing the runnable method and thread 134 terminates.

Figure 3:
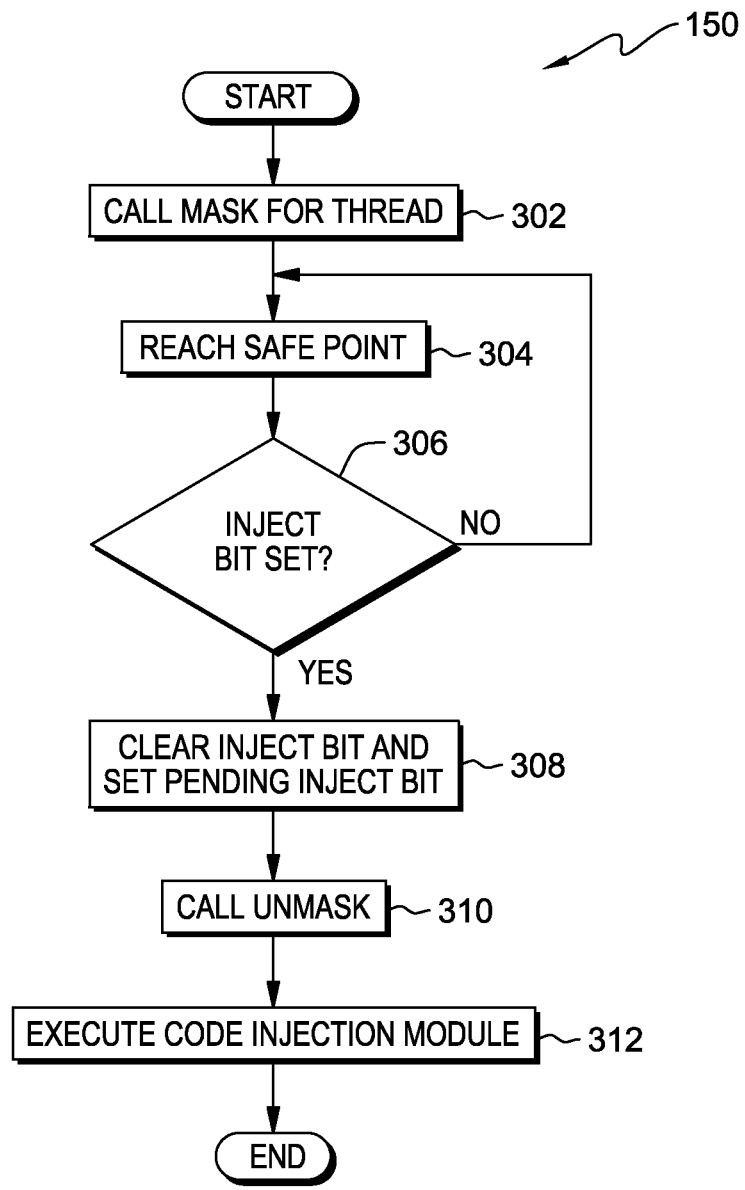
FIG. 3 is a flowchart depicting operational steps of a masking module, on a server computer within the environment of FIG. 1, in accordance with an embodiment of the present invention.

FIG. 3 is a flowchart depicting operational steps of masking module 150 operating within JVM 132, in accordance with an embodiment of the present invention. Embodiments of masking module 150 recognize that there are periods in thread execution during which halting the thread and injecting code into the thread could result in errors and/or exceptions occurring in both the injected code and when the thread attempts to return to normal execution following the removal of the injected code. In various embodiments, masking module 150 instructs JVM 132 to perform actions and manipulate data which may be carried out, for example, by thread 134, or an independent thread operating within JVM 132.

JVM 132 calls a mask for thread 134 (step 302). In one embodiment, thread 134 includes a plurality of associated bits of information. In some embodiments, one of the associated bits of information indicates whether or not a mask was called during the execution of the plurality of frames in stack 136, for example, by executing the code included in mask 140. In one embodiment, a line of computer code executing on thread 134, such as a method of Java bytecode, instructs CPU 172 to set the associated bit that indicates whether or not a thread is masked ("mask bit") to a predefined value, wherein the value indicates that the thread is masked. In various embodiments, masking marks the thread so that code injection module 148 does not instruct JVM 132 to inject any code onto stack 136 even if thread 134 is at a safepoint and inject bit 144 is set to indicate that an injection should occur.

JVM 132 determines that thread 134 reached a safepoint in execution (step 304). Safepoints in threads executing within the JVM occur at predetermined times, for example, at the invocation of a particular method. Safepoint 142 indicates particular points in the execution of thread 134 at which operations other than the code of tenant application 122 may be safely executed by thread 134. In one embodiment of the present invention, safepoint 142 includes instructions to perform maintenance functions or other statistics gathering functions. In another embodiment, safepoint 142 includes instructions to check one or more bits information stored within the thread to determine if any of the maintenance functions or statistics gathering functions should be performed while the thread is at safepoint 142.

JVM 132 determines whether inject bit 144 is set (decision block 306). In one embodiment, one or more of the bits checked during safepoint 142 includes instructions to inject, or push, a particular piece of runnable code to the top stack 136. In various embodiments, this bit can be set to instruct JVM 132 to inject the runnable code at a safepoint or be set to instruct JVM 132 not to inject any runnable code at this safepoint. In some embodiments, the inject bit can be set to inject runnable code at predetermined time intervals, such as once per second. If JVM 132 determines that the inject bit is not set (decision block 306, NO branch), then JVM 132 continues to monitor thread activity until another safepoint occurs in step 304. If JVM 132 determines that the inject bit is set and a sequence of runnable code should be injected onto stack 136 (decision block 306, YES branch), then JVM 132 clears the inject bit and sets a separate, pending inject bit in step 308.

JVM 132 clears the inject bit and sets the pending inject bit (step 308). In some embodiments, JVM 132 does not inject the runnable code onto stack 136 because the mask bit indicates that an injection could result in errors and/or exceptions. In various embodiments, JVM 132 clears inject bit 144 and sets a pending inject bit, which is distinct and separate from inject bit 144, to active so that when thread 134 executes an unmask method call, thread 134 checks the pending inject bit, which indicates that there is a runnable code that should be injected onto stack 136. In alternative embodiments, JVM 132 does not inject the runnable code, but resets inject bit 144 to an active position, so that at the next safepoint, thread 134 checks inject bit 144 again and determines whether the thread is masked by checking the mask bit. In various embodiments, the process of resetting inject bit 144 to active repeats for subsequent safepoints until an unmask method is called for thread 134. Once the unmask method is called, the next safepoint will result in the injection of the runnable section of code onto stack 136.

JVM 132 determines that an unmask method has been called (step 310). An unmask is called when executable bytecode instructs JVM 132 to deactivate the associated mask bit and determine if the pending inject bit is set. In response to determining that the pending inject bit is set, JVM 132 proceeds to execute code injection module 148, as described in FIG. 2, or a functional equivalent thereof (step 312).

In other embodiments, JVM 132 can attempt to set the inject bit to active after a mask has already been called on thread 134. In these embodiments, JVM 132 can check the mask bit stored in association with thread 134 to determine that thread 134 is masked. In response to determining that the thread 134 is masked, JVM 132 can set the pending inject bit to active as described in step 308 of FIG. 3. In these embodiments of the present invention, an unmask method is called as described in step 310 of FIG. 3. Responsive to determining that an unmask method was called, these embodiments proceed to execute code injection module 148, as in step 312 of FIG. 3.

Figure 4:
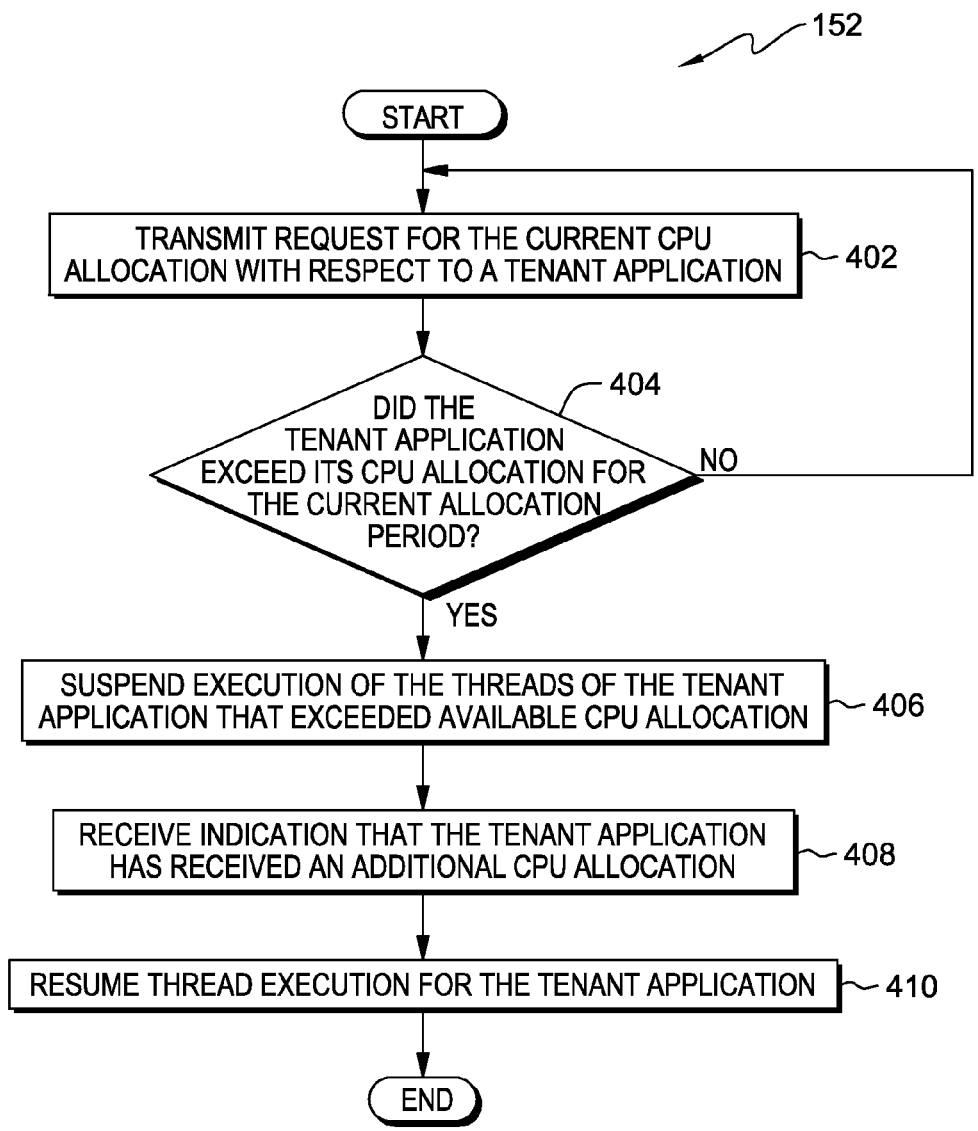
FIG. 4 is a flowchart depicting operational steps of a resource allocation module, on a server computer within the environment of FIG. 1, in accordance with an embodiment of the present invention.

FIG. 4 is a flowchart depicting operational steps of resource allocation module 152, in accordance with an embodiment of the present invention. Resource allocation module 152 is an example embodiment of an acceptable sequence of code instructions that may be injected onto stack 136 in accordance with code injection module 148 and/or masking module 150. To begin with, JVM 132 determines that a safepoint was reached by thread 134, inject bit 144 was set, and code injection module 148 instructed JVM 132 to push resource allocation module 152 to the top of stack 136. Thread 134 begins execution of the program instructions that make up resource allocation module 152.

Thread 134 transmits a request for the current CPU allocation with respect to tenant application 122 (step 402). In one embodiment, thread 134 transmits a request to CPU allocation accumulator 154 to return the current CPU allocation for the tenant application associated with the thread on which resource allocation module 152 is executing. In various embodiments, CPU allocation accumulator 154 maintains a running total of the CPU allocation for each tenant application in the memory of JVM 132. In these embodiments, CPU allocation accumulator 154 can also read and transmit the current state of the CPU allocation for each thread that transmits a request. CPU allocation may be measured in, for example, cycles per second.

Thread 134 determines whether a tenant exceeded its CPU allocation for the current allocation period (decision block 404). Thread 134 analyzes the received CPU allocation to determine whether the running total of cycles that tenant application 122 actually used in the current allocation period exceeded the maximum amount of cycles allocated to tenant application 122 for the time period. In some embodiments, CPU allocation accumulator 154 begins a time period with the maximum number of cycles allowed by each tenant. As the tenant uses cycles, CPU allocation accumulator 154 subtracts those cycles from the initial amount to maintain a running total. If tenant application 122 exceeds its allotment for the time period, then the running total will reach zero cycles (or negative cycles) during the time period. In other embodiments, CPU allocation accumulator 154 may begin each time period with zero cycles for each tenant application. In the other embodiments, thread 134 compares the number of cycles for the tenant at the time of the request with a maximum number of cycles allowed for the tenant, which may be, for example, a constant number stored in association with thread 134 or in heap memory 146. If thread 134 determines that a tenant did not exceed its CPU allocation for the current time period (decision block 404, NO branch), then thread 134 returns to request the current CPU allocation for a subsequent time period in step 402. If thread 134 determines that tenant application 122 did exceed its CPU allocation for the current time period (decision block 404, YES branch), then thread 134 suspends execution of tenant application 122 for the duration of the next allocation time period in step 406.

Thread 134 suspends execution of tenant application (step 406). In one embodiment, thread 134 creates an await condition, which stops the thread execution until the thread receives a signal that an additional allocation of CPU resources has been granted to tenant application 122.

Thread 134 receives a signal that tenant application 122 received an additional CPU allocation (step 408). In an embodiment, CPU allocation accumulator 154 resets so that tenant application 122 receives an additional allocation of CPU cycles at a regular interval of time, for example, once per second. In this embodiment, the program code that resets the CPU allocation for the tenant application can include a program instruction to transmit a signal to thread 134 that an additional allocation has occurred, and thread 134 can terminate the await condition and resume execution of the thread. In response to thread 134 receiving the signal that the await condition has been satisfied, then thread 134 resumes thread execution for the threads associated with tenant application 122 in step 410.

Figure 5:
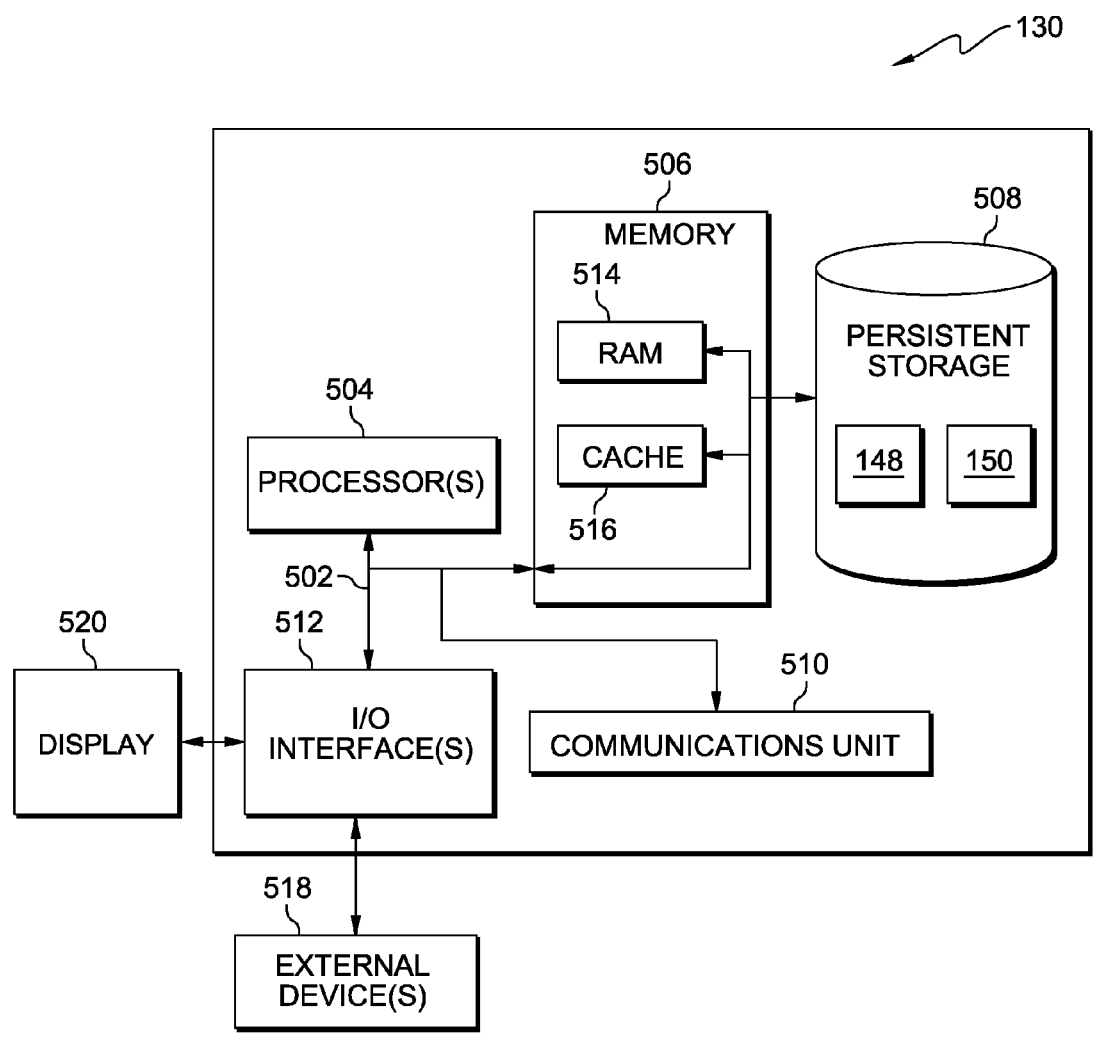
FIG. 5 depicts a block diagram of components of the server computer executing the code injection module and the masking module, in accordance with an embodiment of the present invention.

FIG. 5 depicts a block diagram of components of server computer 130 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 130 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Code injection module 148 and masking module 150 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Code injection module 148 and masking module 150 may be downloaded to persistent storage 508 through communications unit 510.

I/O interface(s) 512 allows for input and output of data with other devices that may be connected to server computer 130. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., code injection module 148 and masking module 150, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for inserting code into a running thread of execution, the computer program product comprising:

one or more non-transitory computer-readable storage media and program instructions stored on the one or more non-transitory computer-readable storage media, the program instructions comprising:

program instructions to set a first set of bits to a first value, wherein the first value indicates that a first set of instructions should be inserted onto a stack of a thread;

program instructions to, responsive to determining that a first method was called, set a second set of bits to a second value, wherein the second value indicates that no set of instructions should be inserted onto the stack until the second set of bits is set to a third value;

program instructions to, at a first safepoint in execution of the thread, execute a second set of instructions to determine if the first set of bits is set to the first value;

program instructions to, responsive to determining that the first set of bits is set to the first value, set a third set of bits to a fourth value, wherein the fourth value indicates that the first set of instructions should be inserted onto the stack, based at least in part on execution of a third set of instructions at a second safepoint in execution of the thread;

program instructions to, responsive to determining that a second method was called, set the second set of bits to the third value, wherein the third value indicates that the thread can safely execute the third set of instructions associated with the second safepoint and insert the first set of instructions onto the stack; and program instructions to, at the second safepoint in execution, execute the third set of instructions and insert the first set of instructions onto the stack.

2. The computer program product of claim 1, wherein the program instructions stored on the one or more non-transitory computer readable storage media further comprise:
   program instructions to execute the first set of instructions; and
   program instructions to remove the first set of instructions from the stack.

3. The computer program product of claim 2, wherein the first set of instructions comprises:
   program instructions to determine that the thread exceeded a resource allocation limit; and
   program instructions to suspend execution of the thread for a period of time.

4. The computer program product of claim 3, wherein the first set of instructions further comprises:
   program instructions to receive a signal indicating that the period of time has ended; and
   program instructions to resume execution of the thread.

5. The computer program product of claim 3, wherein determining that the thread exceeded the resource allocation limit comprises comparing the resource allocation limit with a current number of cycles that the thread has executed.

6. The computer program product of claim 1, wherein the first set of instructions comprises a well-defined set of computer program instructions predetermined to be safe to insert onto the stack.

7. The computer program product of claim 1, wherein the thread is an application thread of a tenant application executing in a multitenant virtual machine.

8. The computer program product of claim 1, wherein the first set of instructions comprise a runnable method to perform one or more functions of: statistic collection, resource management, or thread termination.

9. A computer system for inserting code into a running thread of execution, the computer system comprising:
   one or more computer hardware processors;
   one or more computer-readable storage media;
   program instructions stored on the computer-readable storage media for execution by at least one of the one or more processors, the program instructions comprising:
      program instructions to set a first set of bits to a first value, wherein the first value indicates that a first set of instructions should be inserted onto a stack of a thread;
      program instructions to, responsive to determining that a first method was called, set a second set of bits to a second value, wherein the second value indicates that no set of instructions should be inserted onto the stack until the second set of bits is set to a third value;
      program instructions to, at a first safepoint in execution of the thread, execute a second set of instructions to determine if the first set of bits is set to the first value;
      program instructions to, responsive to determining that the first set of bits is set to the first value, set a third set of bits to a fourth value, wherein the fourth value indicates that the first set of instructions should be inserted onto the stack, based at least in part on execution of a third set of instructions at a second safepoint in execution of the thread;
      program instructions to, responsive to determining that a second method was called, set the second set of bits to the third value, wherein the third value indicates that the thread can safely execute the third set of instructions associated with the second safepoint and insert the first set of instructions onto the stack; and
      program instructions to, at the second safepoint in execution, execute the third set of instructions and insert the first set of instructions onto the stack.

10. The computer system of claim 9, wherein the program instructions stored on the one or more computer readable storage media further comprise:
   program instructions to execute the first set of instructions; and
   program instructions to remove the first set of instructions from the stack.

11. The computer system of claim 10, wherein the first set of instructions further comprises:
   program instructions to determine that the thread exceeded a resource allocation limit; and
   program instructions to suspend execution of the thread for a period of time.

12. The computer system of claim 11, wherein the first set of instructions further comprises:
   program instructions to receive a signal indicating that the period of time has ended; and
   program instructions to resume execution of the thread.

13. The computer system of claim 11, wherein determining that the thread exceeded the resource allocation limit comprises comparing the resource allocation limit with a current number of cycles that the thread has executed.

14. The computer system of claim 9, wherein the thread is an application thread of a tenant application executing in a multitenant virtual machine.

15. The computer system of claim 9, wherein the first set of instructions comprise a runnable method to perform one or more functions of: statistic collection, resource management, or thread termination.

* * * * *